S. BOSS.
DISH DRAINER.
APPLICATION FILED JULY 23, 1910.
986,265.
Patented Mar. 7, 1911.
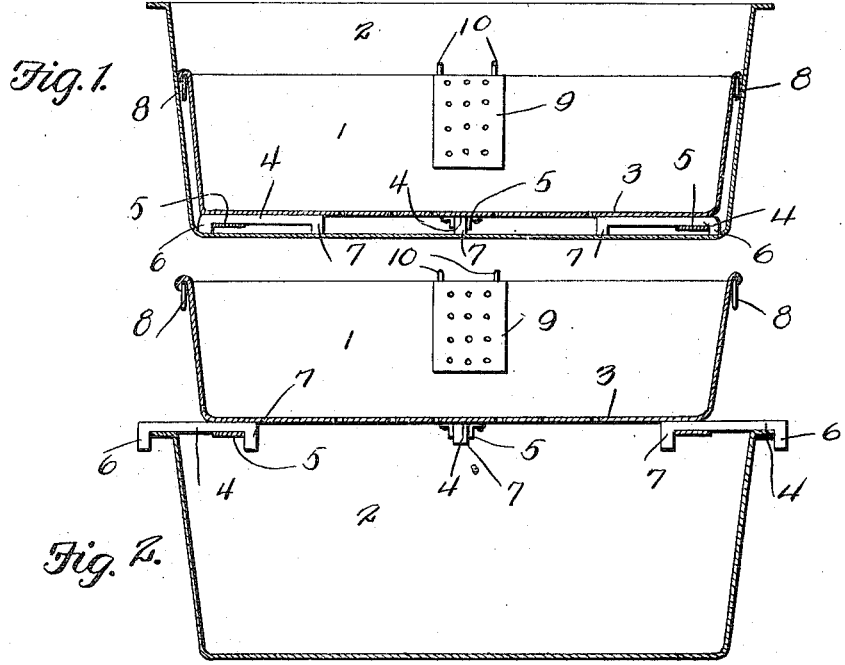
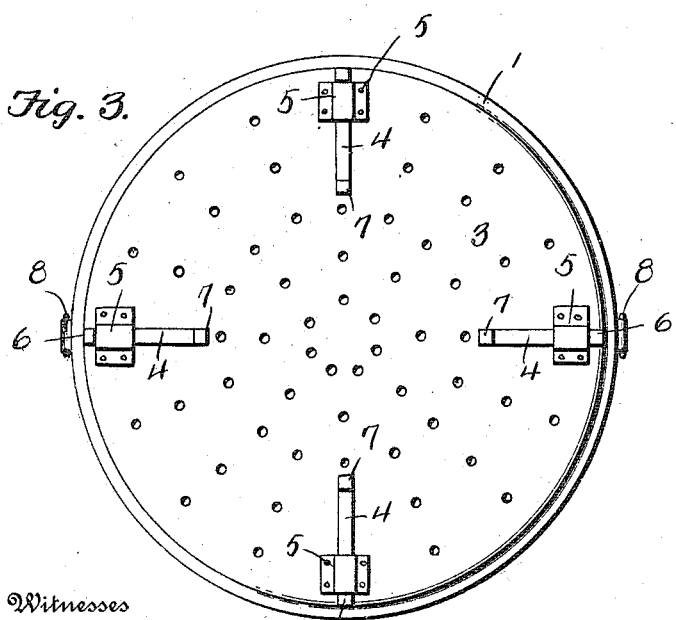
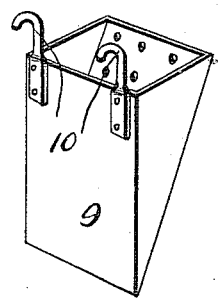
Inventor
Susan Boss
Witnesses
C. C. Richardson
By Victor J. Evans
Attorney

UNITED STATES PATENT OFFICE.

SUSAN BOSS, OF NEWARK, NEW YORK.

DISH-DRAINER.

986,265.  Specification of Letters Patent.  Patented Mar. 7, 1911.

Application filed July 23, 1910. Serial No. 573,383.

*To all whom it may concern:*

Be it known that I, SUSAN BOSS, a citizen of the United States of America, residing at Newark, in the county of Wayne and State of New York, have invented new and useful Improvements in Dish-Drainers, of which the following is a specification.

This invention relates to dish drainers, and has for an object to provide a structure of this character designed for insertion in an ordinary dish pan and designed for the reception of the dishes and to hold them in such position that they may be subjected to the water.

Another object of the invention is to provide a structure of reticulated or foraminous material so that the water will be free to pass directly into the dish pan.

Another object of the invention is to provide a series of adjustable supports designed to engage the upper edge of the pan and to hold the structure directly thereabove.

In the drawing, forming a portion of this specification and in which like numerals of reference indicate similar parts in the several views:—Figure 1 is a detail section through my improved drainer showing its application to a dish pan. Fig. 2 is a similar view showing the same supported from the upper edge of the pan. Fig. 3 is a bottom plan view of the drainer. Fig. 4 is a detail perspective view of the adjustable basket.

My improved drainer consists of a receptacle 1 which is of a design conforming preferably with the ordinary dish pan such as the one shown at 2. The receptacle 1 is formed to provide a foraminous bottom 3 which is spaced from the bottom of the pan 2 by adjustable members 4. These members are of substantially inverted U-form having horizontal portions slidable in guides 5 on the underside of the bottom 3 of the receptacle 1. The supports 4 have depending combined leg and stop-forming portions 6 and 7 which are designed to engage the ends of the guides 5 to limit the sliding movement of such supports as will be understood, and to prevent them from being moved out of engagement with their stops. These supports 4 are of rectangular form preferably, and their guides 5 are correspondingly formed so as to prevent rotation of the supports in the guides.

The construction of the receptacle 1 is such that its side walls are spaced from the side walls of the pan 2. The said receptacle 1 is provided with suitable pivotally mounted bail-like handles 8. A basket 9 of suitable foraminous material is removably and adjustably mounted on the edge of the receptacle 1, suitable supporting hooks 10 being formed on the basket to engage such edge of the receptacle and to permit the basket to be adjusted annularly. The basket 9 is designed for the reception of knives or forks, spoons or the like and they may be subjected to the water when pouring the same onto the dishes.

Upon reference to Fig. 2 of the drawing, it will be seen that the supports 4 are moved to their extended positions in their guides and the portions 7 of such supports are engaged over the edge of the pan. From this construction it will be seen that the draining receptacle 1 can be supported directly from the edge of the pan 2 so that after the desired amount of water has been poured on the articles they may be drained more effectively and held out of contact with any water which may be in the pan 2. If desired, the guides may be used as just described in the initial cleansing of the dishes or like articles.

I claim:

A draining device for dish pans comprising a receptacle having a foraminous portion, slidable supports on the bottom of the receptacle, and stops formed on the supports for engaging the receptacle to limit their sliding movement.

In testimony whereof I affix my signature in presence of two witnesses.

SUSAN X BOSS.
her / mark

Witnesses:
 BERTHA STEDER,
 JANE BOSS.

Copies of this patent may be obtained for five cents each, by addressing the "Commissioner of Patents, Washington, D. C."